US012165558B2

(12) United States Patent
Kim et al.

(10) Patent No.: US 12,165,558 B2
(45) **Date of Patent: *Dec. 10, 2024**

(54) DISPLAY DEVICE

(71) Applicant: SAMSUNG DISPLAY CO., LTD., Yongin-si (KR)

(72) Inventors: Jung Taek Kim, Yongin-si (KR); Jae Woo Ryu, Yongin-si (KR); Joon Suk Baik, Yongin-si (KR); Se Keun Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/358,428

(22) Filed: Jul. 25, 2023

(65) Prior Publication Data

US 2024/0021131 A1 Jan. 18, 2024

Related U.S. Application Data

(63) Continuation of application No. 17/485,771, filed on Sep. 27, 2021, now Pat. No. 11,741,878.

(30) Foreign Application Priority Data

Feb. 18, 2021 (KR) ........................ 10-2021-0022176

(51) Int. Cl.
*G09G 5/00* (2006.01)
*G09G 3/20* (2006.01)

(52) U.S. Cl.
CPC ... *G09G 3/2007* (2013.01); *G09G 2300/0809* (2013.01); *G09G 2310/0267* (2013.01);
(Continued)

(58) Field of Classification Search
CPC ......... G09G 3/2007; G09G 2300/0809; G09G 2310/0267; G09G 2310/027; G09G 2310/08; G09G 2320/043; G09G 2330/021
(Continued)

(56) References Cited

U.S. PATENT DOCUMENTS 9,558,717 B2 1/2017 Takasugi et al.
10,475,386 B2 11/2019 Kim
(Continued)

FOREIGN PATENT DOCUMENTS

KR 10-2019-0002940 1/2019
KR 10-2020-0004483 1/2020
(Continued)

OTHER PUBLICATIONS

Extended European Search Report issued from the European Patent Office on Jun. 24, 2022 in corresponding European Patent Application No. 22157596.2 filed on Feb. 18, 2022.
(Continued)

*Primary Examiner* — Jennifer T Nguyen
(74) *Attorney, Agent, or Firm* — F. Chau & Associates, LLC

(57) ABSTRACT

A display device includes a plurality of pixels, a power supply, a voltmeter, and a timing controller. The power supply is configured to generate an initialization voltage to be supplied to a sensing pixel among the pixels. The voltmeter is configured to measure a first value of the initialization voltage supplied to the sensing pixel during an active period of a frame period and a second value of the initialization voltage supplied to the sensing pixel during a vertical blank period of the frame period. The timing controller is configured to generate rewrite image data that is supplied to the sensing pixel during the vertical blank
(Continued)

period. The rewrite image data is generated from image data applied to the pixels during the active period and a difference between the first and second values.

10 Claims, 9 Drawing Sheets

(52) U.S. Cl.
CPC ... *G09G 2310/027* (2013.01); *G09G 2310/08* (2013.01); *G09G 2320/043* (2013.01); *G09G 2330/021* (2013.01)

(58) Field of Classification Search
USPC .......................................................... 345/212
See application file for complete search history.

(56) References Cited

U.S. PATENT DOCUMENTS

| | | | | |
|---|---|---|---|---|
| 11,322,097 | B2 | 5/2022 | Jeong | |
| 11,741,878 | B2 * | 8/2023 | Kim | G09G 3/3233 345/212 |
| 2013/0207961 | A1 | 8/2013 | Park et al. | |
| 2015/0187268 | A1 | 7/2015 | Tani et al. | |
| 2016/0240144 | A1 * | 8/2016 | Song | G09G 3/3266 |
| 2019/0066587 | A1 * | 2/2019 | Han | G09G 3/3258 |
| 2021/0104195 | A1 | 4/2021 | Choi et al. | |
| 2022/0262295 | A1 | 8/2022 | Kim et al. | |

FOREIGN PATENT DOCUMENTS

| | | | | |
|---|---|---|---|---|
| KR | 10-2020-0080783 | | 7/2020 | |
| KR | 20200080783 | * | 7/2020 | G09G 3/2007 |
| KR | 1020200079964 | | 7/2020 | |
| KR | 10-2168014 | | 10/2020 | |

OTHER PUBLICATIONS

Final Office Action dated Dec. 6, 2022 in corresponding U.S. Appl. No. 17/485,771.
Office Action dated Aug. 23, 2022 in corresponding U.S. Appl. No. 17/485,771.

* cited by examiner

DISPLAY DEVICE

CROSS-REFERENCE TO RELATED APPLICATION

The present non-provisional U.S. Patent application is a continuation of U.S. patent application Ser. No. 17/485,771 filed Sep. 27, 2021, which claims priority under 35 U.S.C. § 119(a) to Korean patent application number 10-2021-0022176 filed on Feb. 18, 2021, the entire disclosures of which is incorporated by reference in their entirety herein.

1. TECHNICAL FIELD

Embodiments of the present disclosure relate to a display device and more particularly to a display device that uses rewrite image data during a vertical blank period.

2. DISCUSSION OF RELATED ART

A flat panel display (FPD) is an electronic viewing technology used to enable people to see content (e.g., still or moving images). An FPD is lighter, thinner, and uses less power than a traditional cathode ray tube (CRT) display. Examples of an FPD include a liquid crystal display device and an organic light emitting display device.

A display panel of an FPD device includes pixels. Each of the pixels includes a light-emitting element and a driving transistor for supplying a driving current to the light-emitting element. Threshold voltage and mobility characteristics of the driving transistors included in the pixels may vary when these pixels degrade over time. Further, the light-emitting elements included in the pixels may also become degraded.

Therefore, an external compensation circuit has been used in display devices to compensate for degradation of pixels.

SUMMARY

At least one embodiment of the present disclosure provides to a display device, which suppresses a phenomenon in which a horizontal line is visually perceived when using an external compensation circuit.

According to an embodiment of the present disclosure, a display device includes pixels, a power supply, a voltage measuring circuit, and a timing controller. The power supply is configured to generate an initialization voltage to be supplied to a sensing pixel, among the pixels. The voltmeter is configured to measure a first value of the initialization voltage supplied to the sensing pixel during an active period of a frame period and measure a second value of the initialization voltage during a vertical blank period of the frame period. The timing controller is configured to generate rewrite image data that is supplied to the sensing pixel during the vertical blank period. The rewrite image data is generated from image data applied to the pixels during the active period and a difference between the first and second values.

The display device may further include a data driver configured to supply a data voltage to the pixels based on the image data applied during the active period and to supply a rewrite data voltage to the sensing pixel based on the rewrite image data during the vertical blank period, wherein the data voltage supplied to the pixels during the active period is different from the rewrite data voltage supplied to the sensing pixel during the vertical blank period.

The active period may be a period during which an image is displayed, and the vertical blank period may include a sensing period during which characteristics of the sensing pixel are sensed and a data rewrite period during which a previous image display state is reconstructed due to supply of the rewrite image data after the sensing period.

The voltmeter may be provided with the initialization voltage from the power supply, and may then convert a value of the initialization voltage into initialization voltage data.

The voltmeter may provide the initialization voltage data to the timing controller, and the timing controller may determine at least one sensing control line used to perform sensing during the sensing period.

The timing controller may store image data that is supplied to the sensing pixel during the active period before the sensing period.

The timing controller may store the initialization voltage data applied to the sensing pixel during the active period as first initialization voltage data, and may store the initialization voltage data applied to the sensing pixel during the vertical blank period as second initialization voltage data.

The timing controller may calculate a correction grayscale value (e.g., a compensation value) based on a difference between the first initialization voltage data and the second initialization voltage data. The rewrite image data may be generated from the image data applied to the pixels during the active period and the correction grayscale value.

According to an embodiment of the present disclosure, a display device includes a plurality of pixels, a timing controller, and a data driver. The timing controller is configured to predict an initialization voltage to be provided to a sensing pixel, among the pixels, during an active period of a subsequent frame period and an initialization voltage to be provided to the sensing pixel during a vertical blank period of the subsequent frame period, and then generate rewrite image data to be supplied to the sensing pixel. The data driver is configured to supply a data voltage to the pixels during the active period and to supply a rewrite data voltage to the sensing pixel based on the rewrite image data during the vertical blank period. The data voltage supplied to the pixels during the active period is different from the rewrite data voltage supplied to the sensing pixel during the vertical blank period.

The active period may be a period during which an image is displayed, and the vertical blank period may include a sensing period during which characteristics of the sensing pixel are sensed and a data rewrite period during which a previous image display state is reconstructed due to supply of the rewrite data voltage after the sensing period.

The timing controller may determine at least one sensing control line used to perform sensing during the sensing period.

The timing controller may store image data that is supplied to the pixels during the active period before the sensing period.

The timing controller may calculate a load accumulated to the pixels located on a previous horizontal line of the determined sensing control line in consideration of the image data applied to the pixels during the active period of one frame period.

The timing controller may predict initialization voltage data to be provided to the sensing pixel in the subsequent frame based on information about a value of the load accumulated in the one frame.

The timing controller may predict first initialization voltage data to be provided to the sensing pixel during an active period of the subsequent frame period and predict second initialization voltage data to be applied to the sensing pixel during a vertical blank period of the subsequent frame period.

The timing controller may calculate a correction grayscale value based on a difference between the first initialization voltage data and the second initialization voltage data.

The timing controller may generate the rewrite image data from image data of the sensing pixel and the correction grayscale value, and the data driver may supply the rewrite data voltage to the sensing pixel during the data rewrite period.

According to an embodiment of the present disclosure, a display device includes a plurality of pixels coupled to a sensing control line extending in a first direction, a data line extending in a second direction vertical to the first direction, a timing controller, and a data driver. The timing controller is configured to determine a grayscale correction rate based on location information of the sensing control line, and generate rewrite image data from image data a sensing pixel among the pixels coupled to the sensing control line and the grayscale correction rate. The data driver is configured to supply a rewrite data voltage to the sensing pixel based on the rewrite image data. The data voltage supplied to the pixels during an active period of a frame period is different from the rewrite data voltage supplied to the sensing pixel during a vertical blank period of the frame period.

The data driver may supply the rewrite data voltage to the sensing pixel through the data line during a data rewrite period in which a previous image display state is reconstructed due to the supply of the rewrite data voltage after a sensing period in which characteristics of the sensing pixel are sensed.

The timing controller may set the grayscale correction rate so that, as a row number of the sensing control line increases in the second direction, a grayscale value of the grayscale correction rate decreases.

According to an embodiment of the present disclosure, a display device is provided including a plurality of pixels and a data driver. The pixels include a sensing pixel that includes a switching transistor connected between a data line and a node, driving transistor connected between a driving voltage and a light source, and a sensing transistor connected between a sensing line and the driving transistor. During a first part of an image period, the data driver provides an initial data voltage to the node through the switching transistor. During a second part of the image period, the data driver provides a reference voltage different from the data voltage to the node through the switching transistor, an initialization voltage to the sensing line, and a sensing signal to the sensing transistor to turn on the sensing transistor. The data driver calculates a compensation value from a first value of the initialization voltage sensed through the sensing line during the second part of the image period and a second value of initialization voltage sensed through the sensing line during the first part of the vertical blank period. The data driver applies a rewrite data voltage based on the initial data voltage and the compensation value during a second part of the vertical blank period.

The data driver may turn off the switching transistor during a third part of the vertical blank period between the first and second parts of the vertical blank period.

The data driver may float the node during a third part of the vertical blank period between the first and second parts of the vertical blank period.

DETAILED DESCRIPTION

Figure 1:
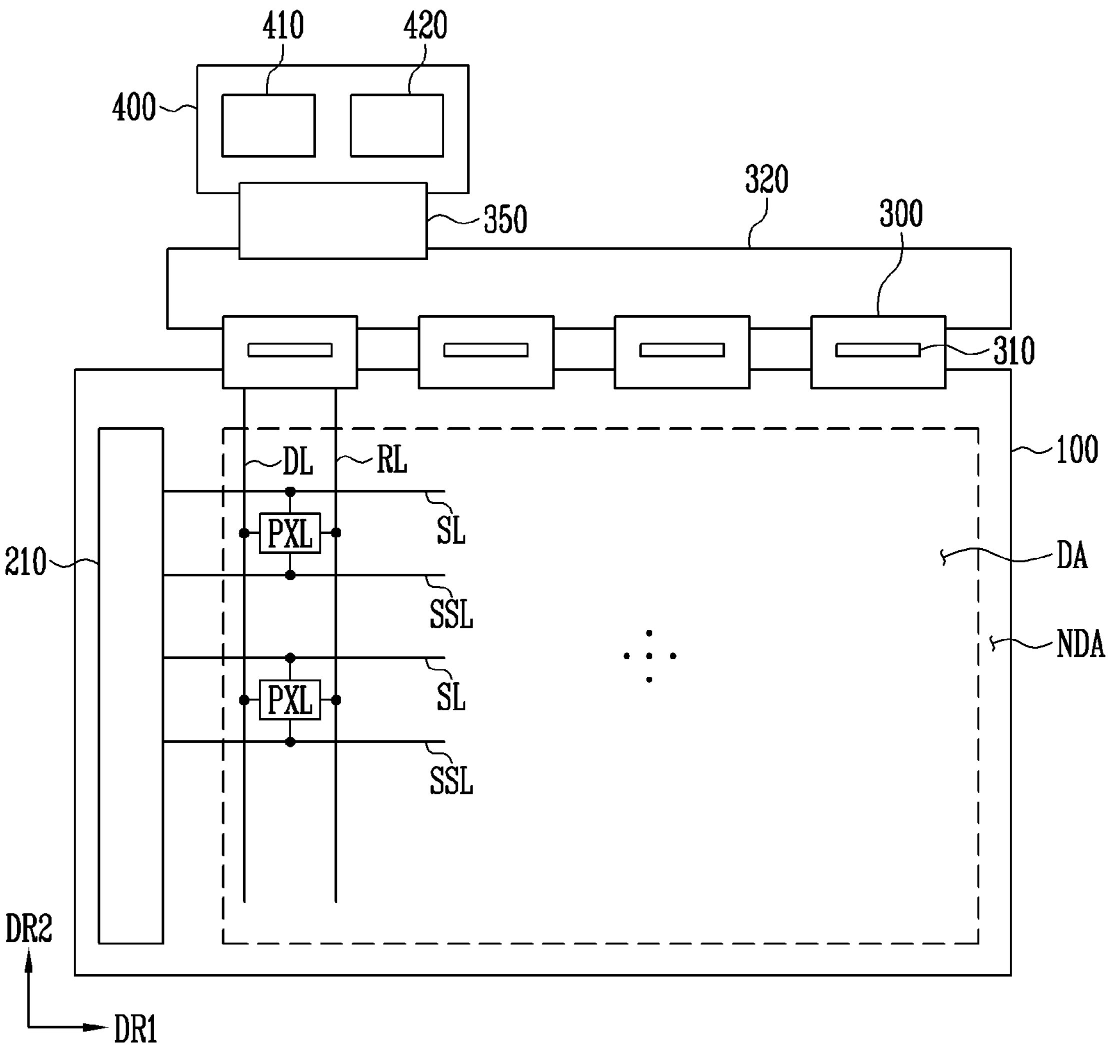
FIG. 1 is a diagram schematically illustrating a display device according to an embodiment.

As the present disclosure allows for various changes and numerous embodiments, particular embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure.

It will be understood that, although the terms “first”, “second”, etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element. In the present disclosure, the singular forms are intended to include the plural forms as well, unless the context clearly indicates otherwise.

It will be further understood that when a first part such as a layer, a film, a region, or a plate is disposed on a second part, the first part may be not only directly on the second part but a third part may intervene between them. Furthermore, when it is expressed that a first part such as a layer, a film, a region, or a plate is formed on a second part, the surface of the second part on which the first part is formed is not limited to an upper surface of the second part but may include other surfaces such as a side surface or a lower surface of the second part. To the contrary, when a first part such as a layer, a film, a region, or a plate is under a second part, the first part may be not only directly under the second part but a third part may intervene between them.

In the present application, the term “coupling” or “connection” may include physical coupling as well as electrical coupling, and may include indirect coupling through an additional component as well as direct coupling.

Hereinafter, a display device in accordance with an embodiment of the present disclosure will be described with reference to the attached drawings.

FIG. 1 is a diagram schematically illustrating a display device according to an embodiment.

Referring to FIG. 1, the display device includes a display panel 100, a scan driver 210 (e.g., a driver circuit), a data driver 310 (e.g., driver circuit), a timing controller 410 (e.g., control circuit), and a power supply 420.

The display device may be a flat panel display device, a flexible display device, a curved display device, a foldable display device, a bendable display device, or a stretchable display device. Also, the display device may be a transparent display device, a head-mounted display device, a wearable display device, or the like. Further, the display device may be applied to various electronic devices, such as a smartphone, a tablet, a smart pad, a television (TV), and a monitor.

The display device may be implemented as a self-emissive display device including a plurality of self-emissive elements. For example, the display device may be an organic light-emitting display device including organic light-emitting elements, a display device including inorganic light-emitting elements, or a display device including light-emitting elements in which an inorganic material and an organic material are configured in combination. However, this is only an embodiment, and the display device may be implemented as a liquid crystal display device, a plasma display device, a quantum dot display device, or the like.

The display panel 100 includes a display area DA in which an image is displayed and a non-display area NDA formed around the display area DA to enclose the display area DA.

The display panel 100 includes a pixel PXL coupled to a scan line SL, a sensing control line SSL, a data line DL, and a sensing line RL. Further, the display panel 100 may include pixels PXL respectively coupled to a plurality of scan lines SL, a plurality of sensing control lines SSL, a plurality of data lines DL, and a plurality of sensing lines RL. For example, in the display panel 100, pixels PXL on each horizontal line arranged in a first direction DR1 may be coupled in common to the scan line SL extending in the first direction DR1 and the sensing control line SSL extending in the first direction DR1. Pixels PXL on each vertical line arranged in a second direction DR2 may be coupled in common to the data line DL extending in the second direction DR2 and the sensing line RL extending in the second direction DR2.

Each pixel PXL may be supplied with a first driving voltage, a second driving voltage, and an initialization voltage from the power supply 420, which will be described later. The detailed configuration of the pixel PXL will be described later with reference to FIG. 2.

Although, in FIG. 1, only the scan line SL and the sensing control line SSL are illustrated as being coupled to the pixel PXL, the present disclosure is not limited thereto. In an embodiment, the display panel 100 may further include one or more emission control lines, etc. in accordance with a circuit structure of the pixel PXL.

The scan driver 210 may be supplied with a scan control signal from the timing controller 410, and may generate a scan signal and a sensing control signal in response to the scan control signal.

The scan driver 210 may provide the scan signal to the scan line SL and provide the sensing control signal to the sensing control line SSL. For example, the scan signal may be set to a gate-on voltage that enables the transistor included in the pixel PXL to be turned on, and may be used to apply a data signal (or a data voltage) to the pixel PXL. Further, the sensing control signal may be set to a gate-on voltage that enables a transistor included in the pixel PXL to be turned on, and may be used to sense (or extract) a driving current flowing through the pixel PXL or apply an initialization voltage to the pixel PXL. Time points at which the scan signal and the sensing control signal are supplied and waveforms of the scan signal and the sensing control signal may be set differently depending on an active period, a sensing period, a vertical blank period, etc.

Although the scan driver 210 is illustrated in FIG. 1 as being mounted, together with the pixel PXL, on the display panel 100, embodiments of the present disclosure are not limited thereto. In accordance with an embodiment, the scan driver 210 may be mounted on a separate circuit film, and may be coupled to the timing controller 410 mounted on a control board 400 via at least one circuit film and a printed circuit board 320.

Although one scan driver 210 is illustrated in FIG. 1 as outputting both the scan signal and the sensing control signal, embodiments of the present disclosure are not limited thereto. In accordance with an embodiment, the scan driver 210 may include a first scan driver, which supplies the scan signal to the display panel 100, and a first sensing driver, which supplies the sensing control signal to the display panel 100. In an embodiment, the first scan driver and the first sensing driver are implemented as separate components. In an embodiment, the first scan driver and the first sensing driver are disposed on opposing sides of the display panel 100 with the display area DA interposed therebetween.

The data driver 310 may be supplied with a data control signal from the timing controller 410, may convert digital image data (or image data) into an analog data signal (or a data voltage) in response to the data control signal, and may provide the data voltage (or the data signal) to the data line DL. For example, the data driver 310 may supply the data signal (or the data voltage) to the data line DL during an active period of one frame (or one image frame period). The data signal may be a data voltage for displaying an effective image, and may be a value corresponding to digital image data (or image data).

Further, the data driver 310 may be supplied with the data control signal from the timing controller 410, may convert rewrite digital image data (or rewrite image data) into an analog rewrite data voltage (or a rewrite data signal) in response to the data control signal, and may provide the rewrite data voltage to the data line DL. For example, the data driver 310 may supply the rewrite data signal (or the rewrite data voltage) to the data line DL after a sensing period in a vertical blank period of one frame. The rewrite data signal may be a data voltage for reconstructing a previous image display state before sensing, and may be a value corresponding to rewrite digital image data (or rewrite image data). In an embodiment, the data driver 310 supplies the rewrite data voltage different from the data voltage, which is supplied to the pixels PXL during the active period, to predetermined pixels PXL during the vertical blank period.

The data driver 310 may supply the initialization voltage supplied from the power supply 420 to the sensing line RL under the control of the timing controller 410. In an embodiment, the data driver 310 separately supplies the initialization voltage so that the initialization voltage is divided into an initialization voltage for display and an initialization voltage for sensing under the control of the timing controller 410. For example, during the active period of one frame or one frame period, the data driver 310 supplies the initialization voltage different from the second driving voltage to the sensing line RL.

The data driver 310 may receive at least one sensing current from at least one pixel PXL, among the pixels PXL, through the sensing line RL. For example, the data driver 310 may receive sensing currents from pixels PXL on one horizontal line during a vertical blank period (e.g., a sensing period) between adjacent active periods. Each sensing current may include information such as the threshold voltage and/or mobility of a driving transistor (or a first transistor) included in the sensed pixel PXL. For example, the threshold voltage or mobility characteristics of the driving transistor can be determined from the sensing current.

Further, the data driver 310 may calculate the characteristics of the driving transistor based on the sensing current, and may provide sensing data corresponding to the calculated characteristics to the timing controller 410. The timing controller 410, which will be described later, may compensate for digital image data/or the data signal based on the sensing data.

Although one data driver 310 is illustrated in FIG. 1 as supplying a data signal and receiving a sensing current, embodiments of the present disclosure are not limited thereto. In an embodiment, the display device may be separately provided with a sensing circuit (not illustrated), wherein the sensing line RL may be coupled to the sensing circuit. Such a sensing circuit may receive a sensing current, may calculate sensing data, and provide the sensing data to the timing controller 410.

The data driver 310 may be mounted on the circuit film 300, and may be electrically coupled to the timing controller 410 via the at least one printed circuit board 320, a cable 350, the control board 400, etc.

The timing controller 410 may be supplied with the image signal and timing control signals from an external device (e.g., a graphics processor). The timing control signals may include a dot clock, a data enable signal, a vertical synchronization signal, a horizontal synchronization signal, etc.

The timing controller 410 may generate a scan control signal for controlling driving timing of the scan driver 210 using the timing control signals that are supplied from an external device and timing setting information or the like that is stored therein and provide the scan control signal to the scan driver 210. The timing controller 410 may generate a data control signal for controlling driving timing of the data driver 310 and provide the data control signal to the data driver 310.

Furthermore, the timing controller 410 may compensate the data signal (or the data voltage) based on the sensing data to generate a compensated data signal. Accordingly, the timing controller 410 may provide the compensated data signal to the data driver 310 during an image display (or an active) period.

In an embodiment, the timing controller 410 measures an initialization voltage that is applied to a pixel PXL to be sensed (or a sensing pixel) during a sensing period, among the pixels PXL, during the active period of one frame and an initialization voltage that is applied to the sensing pixel PXL after a sensing period in the vertical blank period of one frame, calculates a correction grayscale value from the measured voltages, and generates rewrite image data from the image data of the sensing pixel PXL based on the correction grayscale value.

In an embodiment, the timing controller 410 calculates a load accumulated in the pixels PXL based on information about the numbers and/or locations of the sensing control lines SSL and/or sensed pixels PXL, calculates a correction grayscale value by predicting both an initialization voltage to be provided to sensing pixels PXL during an active period of a subsequent frame and an initialization voltage to be provided to the sensing pixels PXL during a vertical blank period of the subsequent period, and generates rewrite image data from the image data of the sensing pixels PXL based on the correction grayscale value.

The timing controller 410 may provide the above-described rewrite image data to the data driver 310 during a data rewrite period after a sensing period. In an example, the rewrite image data may have a value less than that of image data of the sensing pixels PXL before sensing, but embodiments of the present disclosure are not limited thereto.

Further, the timing controller 410 may determine a grayscale correction rate based on information about the locations of the sensing control lines SSL and/or the sensing pixels PXL, and may generate the rewrite image data from the image data of the sensing pixels PXL based on the grayscale correction rate.

The power supply 420 may generate the first driving voltage, the second driving voltage, and the initialization voltage, and may supply the first driving voltage, the second driving voltage, and the initialization voltages to the pixel PXL through power lines. The power lines may be provided in the display panel 100, and the initialization voltage may be supplied to the pixels PXL through the sensing lines RL.

In an embodiment, the power supply 420 is implemented by a power management integrated circuit (PMIC), but embodiments of the present disclosure are not limited thereto. In an embodiment, the power supply 420 generates only the initialization voltage and supplies the initialization voltage to the pixels PXL, and a separate integrated circuit generates the first driving voltage and the second driving voltage and supplies the first and second driving voltages to the pixels PXL.

The timing controller 410 and the power supply 420 may be mounted on the control board 400. The printed circuit board 320 and the control board 400 (hereinafter also referred to as "control printed circuit board") may be coupled to each other through the cable 350, and may enable signal transfer to be performed between the timing controller 410, the power supply 420, and the data driver 310.

The cable 350 may electrically couple the control board 400 and the at least one printed circuit board 320 to each other through connectors (not illustrated). Here, the cable 350 may include a device provided with lines (or wires) that are capable of electrically coupling the control board 400 and the printed circuit board 320 to each other. For example, the cable 350 may be implemented as a flexible circuit board.

In FIG. 1, as an embodiment, a display device provided with a plurality of data drivers (or source driver ICs) is illustrated. However, embodiments of the present disclosure are not limited thereto. For example, the present disclosure may also be applied to a display device provided with one data driver (or one source driver IC).

Hereinafter, the structure of the pixel PXL will be described with reference to FIG. 2.

Figure 2:
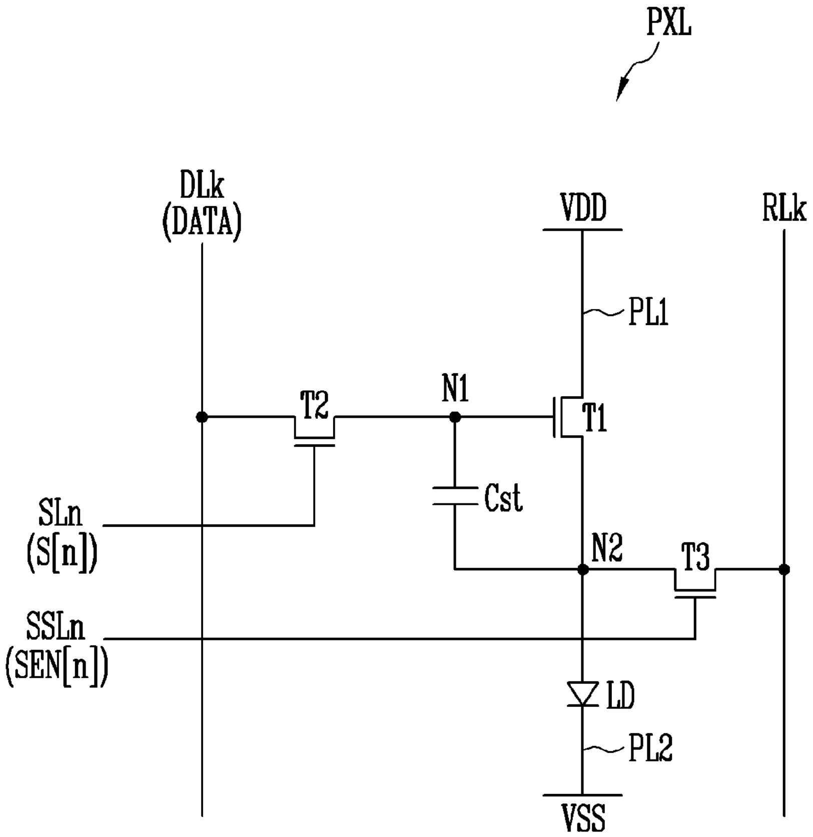
FIG. 2 is a circuit diagram illustrating an example of a pixel included in the display device of FIG. 1.

FIG. 2 is a circuit diagram illustrating an example of a pixel included in the display device of FIG. 1. In FIG. 2, a pixel PXL included in an n-th pixel row and a k-th pixel column is illustrated (where n and k are positive integers) as an example.

Referring to FIG. 2, the pixel PXL includes a light-emitting element LD, a first transistor T1 (or a driving transistor), a second transistor T2 (or a switching transistor), a third transistor T3 (or a sensing transistor), and a storage capacitor Cst.

The light-emitting element LD may generate light with predetermined luminance in accordance with the amount of current supplied from the first transistor T1. The light-emitting element LD may include a first electrode and a second electrode, wherein the first electrode is coupled to a second node N2 and the second electrode is coupled to a second power line PL2 through which the second driving voltage VSS is applied. In an embodiment, the first electrode may be an anode, and the second electrode may be a cathode. In an embodiment, the first electrode may be a cathode, and the second electrode may be an anode.

In an embodiment, the light-emitting element LD is an inorganic light-emitting element formed of an inorganic material. In an embodiment, the light-emitting element LD is an organic light-emitting diode including an organic light-emitting layer. Further, the light-emitting element LD may be a light-emitting element in which an inorganic material and an organic material are combined with each other.

A first electrode of the first transistor T1 may be coupled to the first power line PL1 through which a first driving voltage VDD is applied, and a second electrode of the first transistor T1 may be coupled to the first electrode (or the second node N2) of the light-emitting element LD. A gate electrode of the first transistor T1 may be coupled to a first node N1. In an embodiment, the first electrode may be a drain electrode, and the second electrode may be a source electrode.

The first transistor T1 may control the amount of current flowing into the light-emitting element LD in accordance with the voltage of the first node N1. Here, the first transistor T1 may be turned on when a voltage between the first node N1 and the second node N2 (i.e., a gate-source voltage) is higher than the threshold voltage of the first transistor T1.

A first electrode of the second transistor T2 may be coupled to a k-th data line DLk, and a second electrode of the second transistor T2 may be coupled to the first node N1 (or the gate electrode of the first transistor T1). A gate electrode of the second transistor T2 may be coupled to an n-th scan line SLn. When a scan signal S[n] (e.g., a high-level voltage) is supplied to the n-th scan line SLn, the second transistor T2 may be turned on, and may then transfer a data voltage DATA from a k-th data line DLk to the first node N1.

A first electrode of the third transistor T3 may be coupled to a k-th sensing line RLk, and a second electrode of the third transistor T3 may be coupled to the second node N2 (or the second electrode of the first transistor T1). A gate electrode of the third transistor T3 may be coupled to an n-th sensing control line SSLn. When a sensing control signal SEN[n] (e.g., a high-level voltage) is supplied to the n-th sensing control line SSLn, the third transistor T3 may be turned on, and may then electrically couple the k-th sensing line RLk and the second node N2 to each other. Accordingly, for a predetermined period of time, the initialization voltage may be provided to the second node N2. However, embodiments of the present disclosure are not limited thereto, and a sensing current (or a sensing voltage) corresponding to the node voltage of the second node N2 may be transferred to the k-th sensing line RLk. The sensing voltage may be provided to a data driver (e.g., 310 of FIG. 1) through the k-th sensing line RLk.

The storage capacitor Cst may be coupled between the first node N1 and the second node N2. The storage capacitor Cst may charge the data voltage DATA corresponding to the data signal supplied to the first node N1 in one frame. Accordingly, the storage capacitor Cst may store a voltage corresponding to a voltage difference between the first node N1 and the second node N2. Here, when the data voltage DATA is supplied, the initialization voltage may be supplied to the second node N2, and thus the storage capacitor Cst may store a voltage difference between the data voltage DATA and the initialization voltage. Depending on the voltage stored in the storage capacitor Cst, the turn-on or turn-off operation of the first transistor T1 may be determined.

However, in the present disclosure, the circuit structure of a pixel PXL is not limited to the structure illustrated in FIG. 2. In an example, the light-emitting element LD may be interposed between the first power line PL1 coupled to a source of the first driving voltage VDD and the first electrode of the first transistor T1.

Although, each transistor is illustrated in FIG. 2 as being a negative-metal-oxide-semiconductor (NMOS) transistor, the embodiments of the present disclosure are not limited thereto. In an example, at least one of the first to third transistors T1, T2, and T3 may be implemented as a positive-metal-oxide-semiconductor (PMOS) transistor. Further, the first to third transistors T1, T2, and T3 illustrated in FIG. 2 may be a thin-film transistor including at least one of an oxide semiconductor, an amorphous silicon semiconductor, and a polycrystalline silicon semiconductor.

Figure 3:
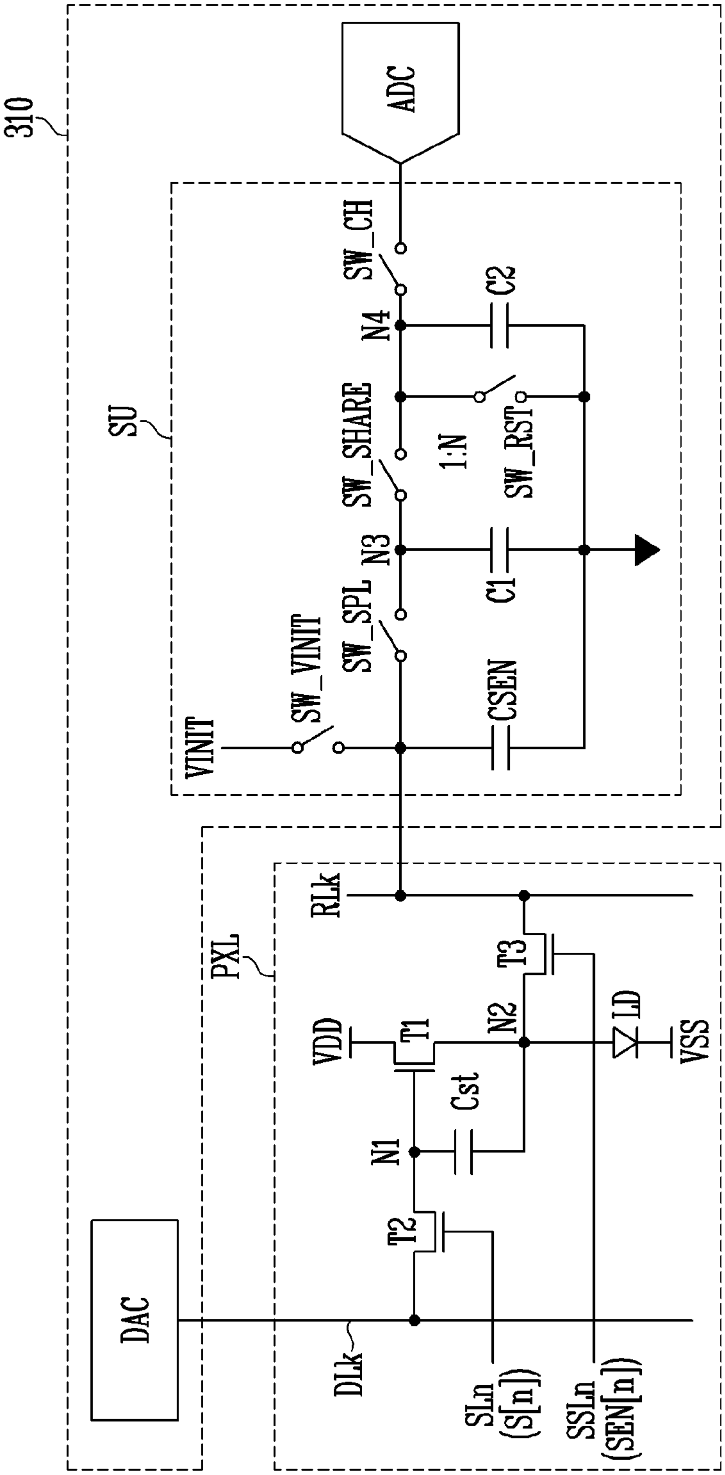
FIG. 3 is a circuit diagram illustrating an example of a data driver included in the display device of FIG. 1.

FIG. 3 is a circuit diagram illustrating an example of the data driver included in the display device of FIG. 1. In FIG. 3, based on a part of the data driver 310, which is coupled to a pixel PXL through a k-th sensing line RLk and which senses the characteristics of the pixel PXL, the data driver 310 is illustrated in brief. Because the pixel PXL illustrated in FIG. 3 is the same as the pixel PXL described with reference to FIG. 2, a repeated description thereof will be omitted.

In an embodiment, the data driver 310 includes a digital-to-analog converter (DAC). The DAC may generate a data voltage DATA corresponding to a data value (or grayscale data) included in frame data (or image data). For example, the DAC may select one of gamma voltages based on the data value and output the selected gamma voltage as the data voltage DATA. Meanwhile, the data driver 310 may further include an output buffer (not illustrated), and may also provide the data voltage DATA to the k-th data line DLk through the output buffer.

In an embodiment, the data driver 310 further includes a sensing unit SU (e.g., a sensing circuit) coupled to the k-th sensing line RLk, and an analog-to-digital converter (ADC).

In an embodiment, the sensing unit SU includes an initialization switch SW_VINIT, a sensing capacitor CSEN, a sampling switch SW SPL, a first capacitor C1, a sharing switch SW_SHARE, a reset switch SW_RST, a second capacitor C2, and an output switch SW_CH.

The initialization switch SW_VINIT may be coupled between a power line to which an initialization voltage VINIT is applied and the k-th sensing line RLk. Here, the initialization voltage VINIT may be provided from a power supply (e.g., 420 of FIG. 1), and may have a voltage level lower than that of a voltage enabling the light-emitting element LD to be operated. When the initialization switch SW_VINIT is turned on, the initialization voltage VINIT may be applied to the k-th sensing line RLk, where when the third transistor T3 of the pixel PXL is turned on, the initialization voltage VINIT may be applied to the second node N2 of the pixel PXL. Because the initialization voltage VINIT has a voltage level lower than that of the voltage enabling the light-emitting element LD to be operated, the light-emitting element LD does not emit light even if the first transistor T1 is turned on.

The sensing capacitor CSEN may be coupled between the k-th sensing line RLk and a reference power source. Here, the reference power source may have, but is not limited to, a ground voltage. When the initialization switch SW_VINIT is turned off and the third transistor T3 of the pixel PXL is turned on, the sensing capacitor CSEN may be charged by a sensing current provided through the second node N2. That is, characteristic information of the pixel PXL provided through the second node N2 may be stored in the sensing capacitor CSEN.

The sampling switch SW SPL may be coupled between the k-th sensing line RLk and the third node N3. The first capacitor C1 may be coupled between the third node N3 and the reference power source. While the sampling switch SW SPL is turned on, the first capacitor C1 may sample the characteristic information of the pixel PXL (or the first transistor T1), stored in the sensing capacitor CSEN. That is, the data driver 310 may sample the sensing signal through the sampling switch SW SPL and the first capacitor C1.

The sharing switch SW_SHARE may be coupled between the third node N3 and a fourth node N4, the reset switch SW_RST may be coupled between the fourth node N4 and the reference power source, and the second capacitor C2 may be coupled between the fourth node N4 and the reference power source. When the sharing switch SW_SHARE is turned on, and the first capacitor C1 and the second capacitor C2 share charges with each other, a node voltage of the fourth node N4 (and a node voltage of the third node N3) may vary. Depending on the operations of the sharing switch SW_SHARE and the reset switch SW_RST, the sharing switch SW_SHARE, the reset switch SW_RST, and the second capacitor C2 may function as a buffer. Here, although the gain of the buffer varies with the capacitance ratio of the first capacitor C1 and the second capacitor C2, the buffer gain may be N (where N is an integer greater than 1). That is, the sharing switch SW_SHARE, the reset switch SW_RST, and the second capacitor C2 may amplify the node voltage of the third node N3.

The output switch SW_CH may be coupled between the fourth node N4 and the analog-to-digital converter (ADC), and may couple the fourth node N4 to an input terminal of the analog-to-digital converter (ADC). In this case, the node voltage of the fourth node N4 may be applied to the analog-to-digital converter (ADC).

Although not illustrated in FIG. 3, the sensing unit SU may further include a capacitor, which is coupled between the input terminal of the ADC and the reference power source to maintain the node voltage of the fourth node N4 that is provided to the ADC, and an initialization circuit (e.g., a capacitor initialization power source and a switch for coupling the capacitor initialization power source to the input terminal of the ADC) which initializes the input terminal of the ADC (or the capacitor).

The analog-to-digital converter (ADC) may convert a voltage provided to the input terminal thereof into a data value (e.g., digital code). That is, the data driver 310 may convert the sensing signal, sampled through the ADC, from an analog format into a digital format. The digital-format sensing signal (e.g., sensing data) may be provided to the timing controller 410.

Although, the sensing unit SU is illustrated in FIG. 3 as including the capacitors CSEN, C1, and C2 and the switches SW_VINIT, SW SPL, SW_SHARE, SW_RST, and SW_CH, this configuration is only an example and embodiments of the present disclosure are not limited thereto. For example, when the sensing unit SU is capable of detecting the voltage (or current corresponding thereto) of the second node N2 of the pixel PXL, various types of circuits (e.g., a sensing circuit for converting a sensing current into a sensing voltage using an amplifier and for sampling and holding the converted sensing voltage) may be implemented as the sensing unit SU.

Below, the operation of the display device of FIG. 1 and the pixel of FIG. 2 will be described with reference to FIGS. 4 and 5.

Figure 4:
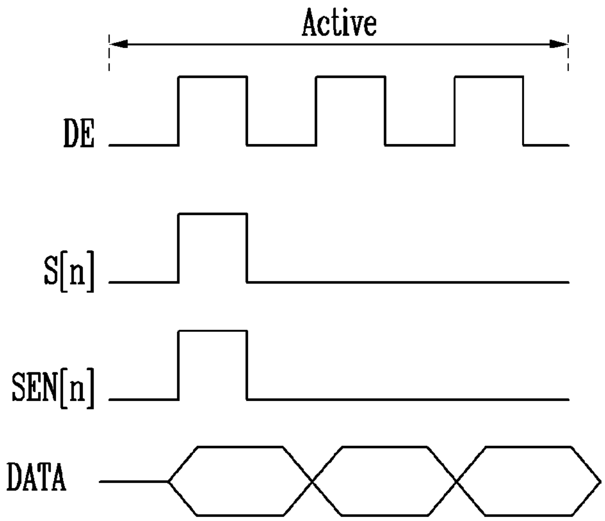
FIG. 4 is a timing diagram illustrating an example of the operation of the pixel of FIG. 2.
Figure 5:
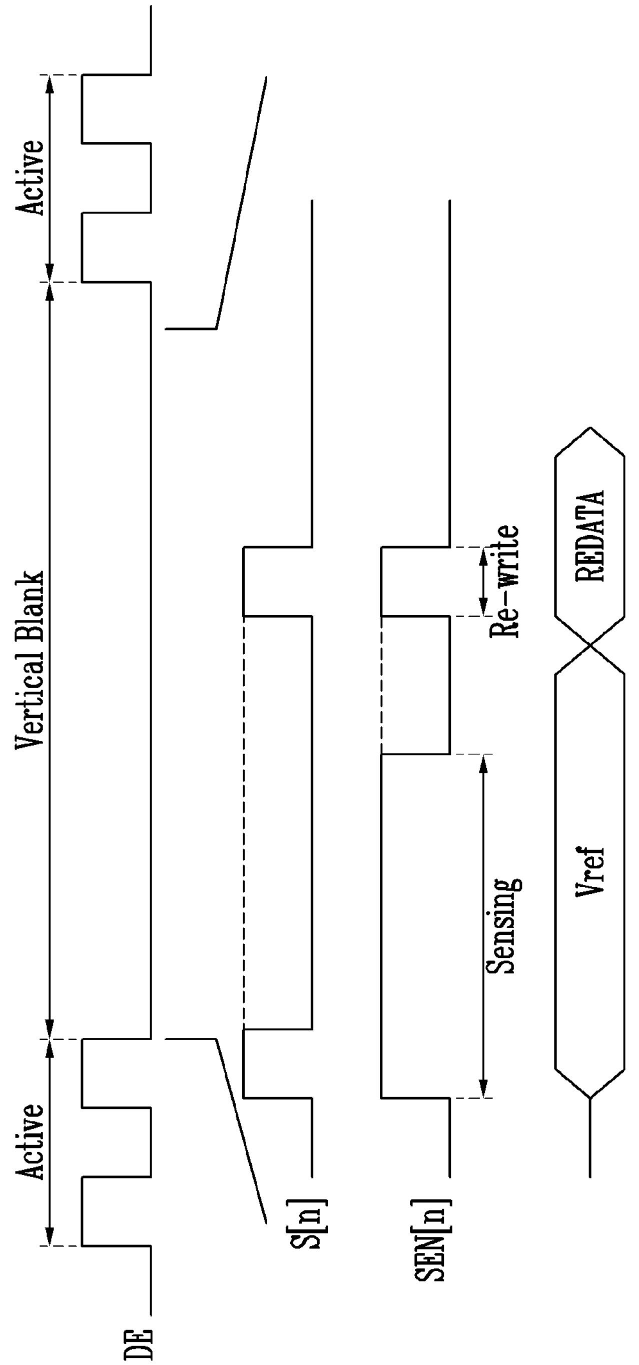
FIG. 5 is a timing diagram illustrating an example of the operation of the pixel of FIG. 2.

FIG. 4 is a timing diagram illustrating an example of the operation of the pixel of FIG. 2, and FIG. 5 is a timing diagram illustrating an example of the operation of the pixel of FIG. 2. FIG. 4 illustrates an example of the operation of the pixel PXL during an active period, and FIG. 5 mainly illustrates an example of the operation of the pixel PXL during a vertical blank period. Hereinafter, the operation of the pixel PXL will be described in detail with reference to FIGS. 4 and 5 along with FIGS. 2 and 3.

Referring to FIGS. 4 and 5, driving of each pixel PXL may include an active period Active and a vertical blank period Vertical Blank between adjacent active periods Active.

In FIGS. 4 and 5, a data enable signal DE may define the active period Active (or effective data period) during which image data is applied, and a period during which the data enable signal DE is not applied may be the vertical blank period Vertical Blank. In an embodiment, the data enable signal DE periodically toggles during the active period Active and has a constant level during the vertical blank period Vertical Blank.

During the active period Active, a scan signal S[n] may be supplied to the second transistor T2 through an n-th scan line SLn, and a sensing control signal SEN[n] may be applied to the third transistor T3 through an n-th sensing control line SSLn. Accordingly, the second transistor T2 may be turned on, and then a data voltage DATA may be transferred to the first node N1. Also, the third transistor T3 may be turned on, and the initialization voltage VINIT may be transferred to the second node N2.

In the storage capacitor Cst, a voltage corresponding to the difference between the data voltage DATA and the initialization voltage VINIT may be stored. Accordingly, the first transistor T1 may apply a current corresponding to the voltage stored in the storage capacitor Cst to the light-emitting element LD. Therefore, the light-emitting element LD may generate light with predetermined luminance.

During the vertical blank period Vertical Blank, the driving of at least one pixel PXL may include a sensing period Sensing and a data rewrite period Re-write.

That is, during each vertical blank period Vertical Blank, the display device may select at least one pixel PXL (or pixels PXL disposed on one horizontal line), may perform a sensing of characteristics of the selected pixel PXL, and may apply a re-write data voltage REDATA for reconstructing a previous image display state after the sensing. For example, the re-write data voltage REDATA may be applied to the selected pixel PXL.

During the sensing period Sensing, the second transistor T2 may be turned on, and then a reference voltage Vref may be supplied to the first node N1. In an embodiment, the reference voltage Vref is a constant voltage or not derived from a data voltage that may include low and high voltages or varying voltages. The third transistor T3 may be turned on, and then the initialization voltage VINIT may be supplied to the second node N2 for a predetermined period of time. In an embodiment, the second transistor T2 is turned off during the predetermined period and the predetermined period occurs during a beginning of the vertical blank period. For example, the third transistor T3 may be turned on by setting the sensing control signal SEN[n] to a high voltage as shown in FIG. 5. After the predetermined period of time has elapsed, the initialization switch (e.g., SW_VINIT of FIG. 3) of the sensing unit (e.g., SU of FIG.

3) supplying the initialization voltage VINIT is turned off, thus allowing the second node N2 to float. The data driver (e.g., 310 of FIG. 3) may sense the characteristics of the driving transistor (e.g., a current attributable to the gate-source voltage difference of the driving transistor) from the second node N2.

Thereafter, during the data rewrite period Re-write, in order to reconstruct the previous image display state before the sensing, the second transistor T2 may be turned on to enable the rewrite data voltage REDATA to be supplied to the first node N1, and the third transistor T3 may be turned on to enable the initialization voltage VINIT to be supplied to the second node N2. In an embodiment, the rewrite data voltage REDATA is applied to the data line DLk so it can be supplied to the first node N1. In an embodiment, after the sensing period Sensing but before the data rewrite period Re-write, the third transistor T3 is turned off by setting the sensing control signal SEN[n] to a low voltage. In an embodiment, the second transistor T2 is turned off during the vertical blank period except during the data rewrite period Re-write. For example, a scan signal may be set to a low voltage to turn off the second transistor T2.

Meanwhile, after the data voltage DATA has been supplied during the active period Active, the voltage of the second node N2 may be increased through light emission by the light-emitting element LD. Furthermore, the power supply (e.g., 420 of FIG. 1) which supplies the initialization voltage VINIT during the active period Active may unstably supply the initialization voltage VINIT to the second node N2 depending on driving ability. In contrast, during the sensing period Sensing, the second node N2 may float, thus stably maintaining the voltage. That is, during the active period Active and the sensing period Sensing, the initialization voltage VINIT that is applied to the second node N2 may vary.

Therefore, when an initialization voltage VINIT less than or equal to the initialization voltage VINIT, applied during a previous active period Active, is supplied and the same data voltage DATA as that of the active period Active is rewritten to the first node N1 during the data rewrite period Re-write, the voltage of the second node N2 becomes lower than the data voltage DATA equally transferred to the first node N1, and thus the driving current calculated by the first transistor T1 may increase. Accordingly, the luminance of the light-emitting element LD appearing during the data rewrite period Re-write and the active period Active after the sensing period Sensing may become higher than that of the light-emitting element LD appearing during the active period Active before the sensing period Sensing.

In contrast, in an embodiment of the disclosure, the voltage of the second node N2 (i.e., the anode voltage of the light-emitting element LD) increases due to light emission by the light-emitting element LD during the active period Active before the sensing period Sensing. Accordingly, the initialization voltage VINIT that is transferred to the second node N2 may be measured or predicted during the data rewrite period Re-write after the sensing period Sensing. Then, when the rewrite data voltage REDATA is applied to the first node N1 to correspond to the initialization voltage VINIT transferred to the second node N2, the difference between the driving current produced by the first transistor T1 during the active period Active before the sensing period Sensing and the driving current produced by the first transistor T1 during the data rewrite period subsequent to the sensing period may be reduced. That is, a display device in which a luminance difference does not occur in the light-emitting element LD may be implemented.

Therefore, in the display device, a phenomenon in which a horizontal line is visually perceived due to real-time sensing using an external compensation circuit may be suppressed.

Hereinafter, a method for correcting a data voltage during a data rewrite period through the timing controller will be described in detail with reference to FIGS. 6 and 7.

Figure 6:
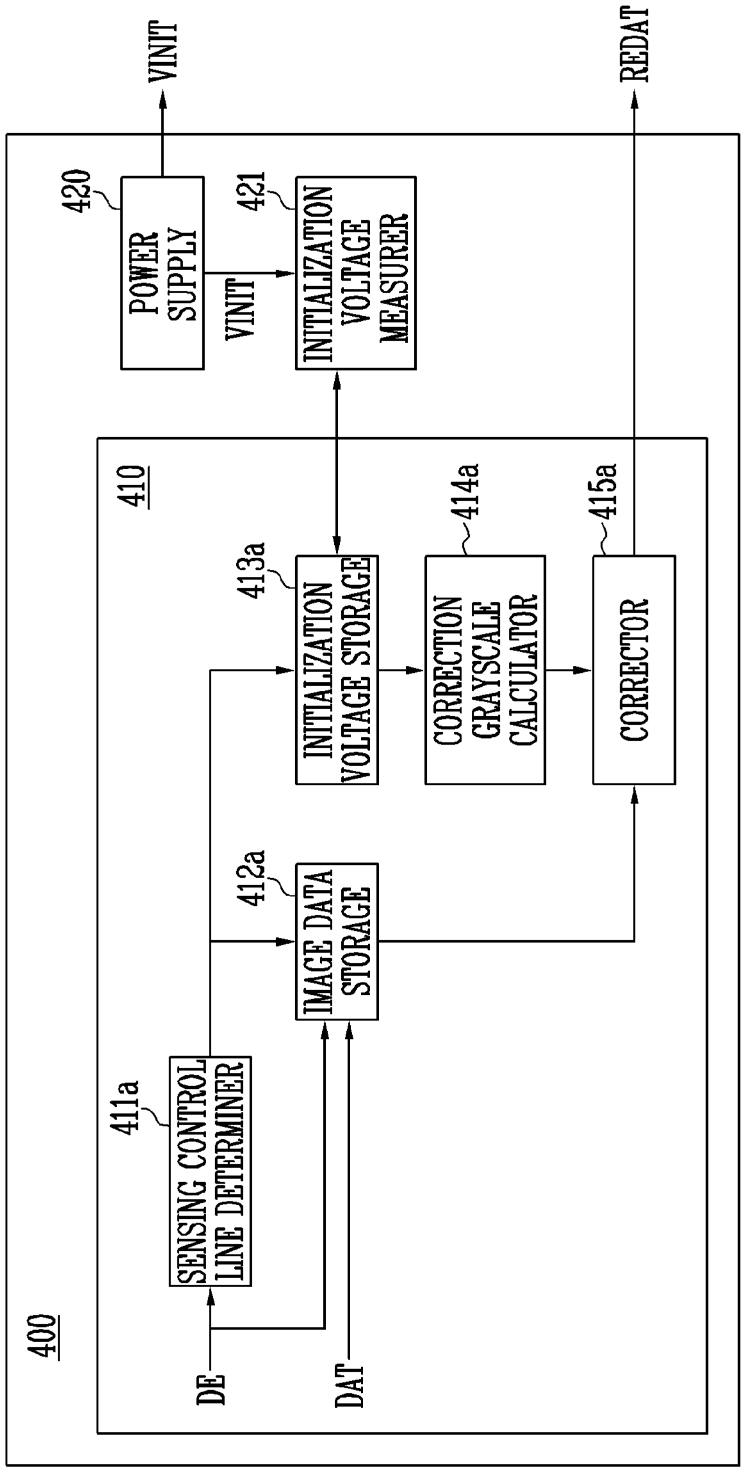
FIG. 6 is a block diagram illustrating an example of a control board and a timing controller included in the display device of FIG. 1.
Figure 7:
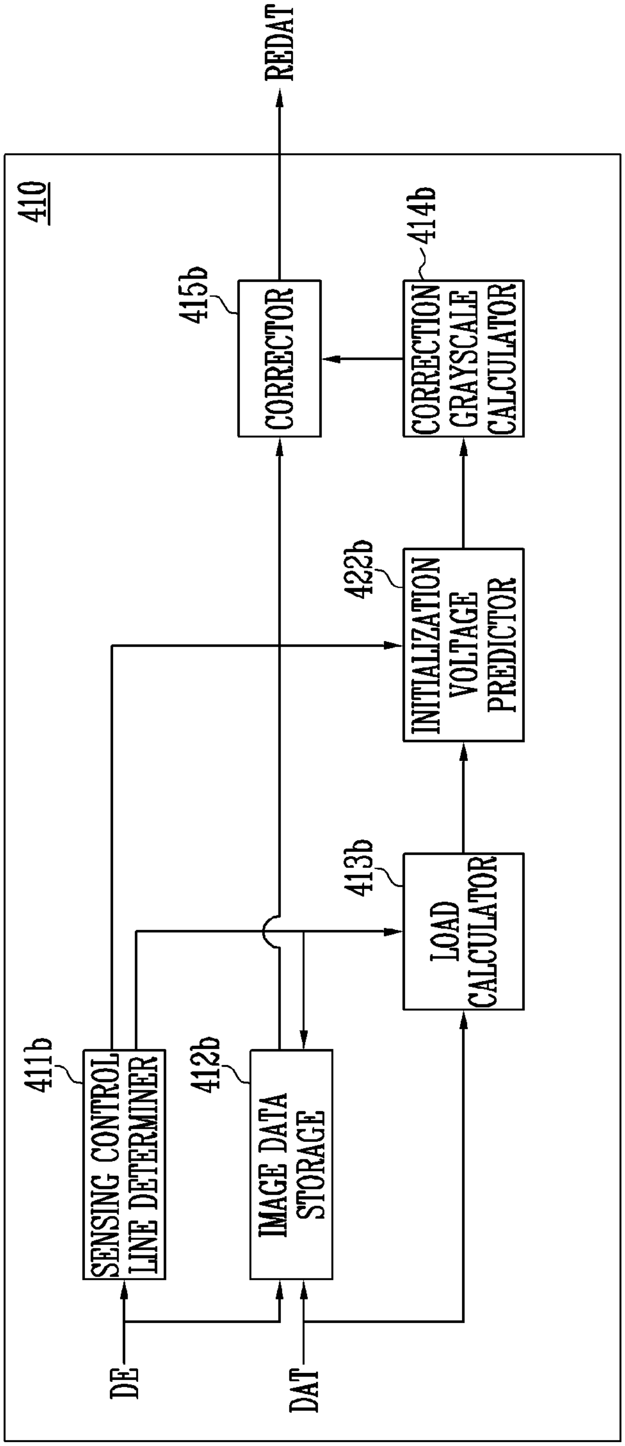
FIG. 7 is a block diagram illustrating an example of the timing controller included in the display device of FIG. 1.

FIG. 6 is a block diagram illustrating an example of the control board and the timing controller included in the display device of FIG. 1, and FIG. 7 is a block diagram illustrating an example of the timing controller included in the display device of FIG. 1. Hereinafter the configuration of the control board and the timing controller will be described with reference to FIGS. 6 and 7 along with FIGS. 1 to 5.

First, referring to FIG. 6, the timing controller 410 include a sensing control line determiner 411*a* (e.g., a control circuit), an image data storage 412*a*, an initialization voltage storage 413*a*, a correction grayscale calculator 414*a*, and a corrector 415*a* (e.g., a correction circuit), and the timing controller 410, the power supply 420, and the initialization voltage measurer 421 (e.g., a measurer circuit, a voltmeter, etc.) may be mounted on the control board 400.

The power supply 420 may generate an initialization voltage VINIT, and may supply the initialization voltage VINIT to the display panel (e.g., 100 of FIG. 1). For example, the initialization voltage VINIT may be provided to the second node (e.g., N2 of FIG. 2) of the pixel PXL through the k-th sensing line (e.g., RLk of FIG. 2) via the cable (e.g., 350 of FIG. 1) coupled to the control board 400, the printed circuit board (e.g., 320 of FIG. 1), the circuit film (e.g., 300 of FIG. 1), and the data driver 310. Further, the power supply 420 may provide the initialization voltage VINIT in an analog format to the initialization voltage measurer 421.

The initialization voltage measurer 421 may measure a value of the initialization voltage VINIT that is provided to the second node N2 of the pixel PXL (or the source voltage) depending on the initialization voltage VINIT provided from the power supply 420. In an embodiment, the initialization voltage measurer 421 is an analog-to-digital converter (ADC). The ADC may convert the value of the measured initialization voltage VINIT into a data value (e.g., digital code), and may provide the data value to the initialization voltage storage 413*a*.

The initialization voltage measurer 421 may measure the initialization voltage VINIT applied to the pixel PXL during the active period Active, and may measure the initialization voltage VINIT applied to the pixel PXL during the sensing period Sensing.

The sensing control line determiner 411*a* may determine at least one sensing control line (e.g., SSL of FIG. 1) used to perform sensing during a vertical blank period Vertical Blank. In an embodiment, the determined sensing control line SSL may be any one sensing control line SSL, among the plurality of sensing control lines SSL illustrated in FIG. 1. Such a sensing control line SSL may be preset through a lookup table. Accordingly, pixels PXL, which are arranged in parallel in a row direction (or a first direction DR1) of the display panel (e.g., 100 of FIG. 1) and are disposed on one horizontal line coupled to one sensing control line SSL, may be selected to perform sensing. However, embodiments of the present disclosure are not limited thereto. For example, the sensing control line determiner 411*a* may select a plurality of sensing control lines SSL to perform sensing.

The sensing control line determiner 411*a* may receive the data enable signal DE, and may be operated during the sensing period Sensing of the vertical blank period Vertical Blank depending on whether the data enable signal DE has been applied. For example, when the data enable signal DE is not applied for a predetermined period of time, the sensing control line determiner 411*a* may determine the sensing control line SSL used to perform sensing.

The sensing control line determiner 411*a* may provide information about the numbers and/or the locations of sensing control lines SSL and sensing pixels PXL determined to perform sensing in the image data storage 412*a* and the initialization voltage storage 413*a*.

The image data storage 412*a* may store image data DAT supplied to the pixels PXL coupled to the sensing control lines SSL determined to perform sensing during an active period Active before the sensing period Sensing. The information about the number and/or locations of the sensing control lines SSL and the pixels PXL, determined to perform sensing, may be provided from the sensing control line determiner 411*a*.

The image data storage 412*a* may be operated during the sensing period Sensing of the vertical blank period Vertical Blank depending on whether the data enable signal DE has been applied. For example, when the data enable signal DE is applied for a predetermined period of time, the image data storage 412*a* may store the image data DAT transferred to the sensing pixels PXL, among the pixels PXL, during the active period Active before the sensing period Sensing.

The image data storage 412*a* may provide the image data DAT of the pixels PXL determined to perform sensing to the corrector 415*a*.

The initialization voltage storage 413*a* may store initialization voltage data that is applied to the sensing pixels PXL (e.g., second node N2) during the active period Active, among pieces of initialization voltage data provided from the initialization voltage measurer 421, as first initialization voltage data, and may store initialization voltage data that is applied to the sensing pixels PXL (e.g., the second node N2) after sensing as second initialization voltage data.

That is, the initialization voltage storage 413*a* may be provided with the pieces of initialization voltage data from the initialization voltage measurer 421, may be provided with the information about the sensing control lines SSL and the sensing pixels PXL, determined to perform sensing, from the sensing control line determiner 411*a*, and may then store the second initialization voltage data applied to the pixels PXL after sensing. The initialization voltage storage 413*a* may provide the first initialization voltage data and the second initialization voltage data of the sensing pixels PXL to the correction grayscale calculator 414*a*.

Based on the difference between the first initialization voltage data transferred to the sensing pixels PXL during the active period Active before the sensing period Sensing, and the second initialization voltage data transferred to the sensing pixels PXL after sensing, the correction grayscale calculator 414*a* may calculate a correction grayscale value corresponding to the difference between the pieces of voltage data. The correction grayscale calculator 414*a* may provide the calculated correction grayscale value to the corrector 415*a*.

The corrector 415*a* may receive the image data DAT of the sensing pixels PXL from the image data storage 412*a* during the active period Active and receive the correction grayscale value for the sensing pixels PXL from the correction grayscale calculator 414*a*, and may then generate rewrite image data REDAT by applying the correction grayscale value to the image data DAT. In an embodiment, the corrector 415*a* may generate the rewrite image data REDAT by adding the correction grayscale value to the image data DAT of the sensing pixels PXL, but embodiments of the present disclosure are not limited thereto.

The corrector 415*a* may provide the rewrite image data REDAT to the data driver 310, and the data driver 310 may convert the rewrite image data REDAT into a rewrite data voltage REDATA, and may supply the rewrite data voltage REDATA during a data rewrite period Re-write after the sensing period under the control of the timing controller 410.

In an embodiment, the initialization voltage VINIT that is transferred to the pixel PXL (e.g., the second node N2) during the active period Active and the initialization voltage VINIT that is transferred to the pixel PXL (e.g., the second node N2) after the sensing period Sensing may be measured. Accordingly, even if the source voltage of the driving transistor T1 (or the voltage of the second node N2) included in the pixel PXL has varied before and after sensing, the rewrite data voltage REDATA corresponding to the source voltage of the driving transistor T1 is applied to the gate voltage of the driving transistor T1 (or the voltage of the first node N1), and thus a display device in which a luminance difference does not occur in the light-emitting element LD may be implemented.

Therefore, in the display device according to an embodiment, a phenomenon in which a horizontal line is visually perceived due to real-time sensing during external compensation may be suppressed.

Referring to FIG. 7, the timing controller 410 may include a sensing control line determiner 411*b* (e.g., a determiner circuit), an image data storage 412*b*, a load calculator 413*b*, a correction grayscale calculator 414*b*, an initialization voltage predictor 422*b* (e.g., a prediction circuit), and a corrector 415*b* (e.g., a correction circuit).

The sensing control line determiner 411*b* may determine at least one sensing control line SSL used to perform sensing during a vertical blank period Vertical Blank of a current frame, and may determine, in advance, at least one sensing control line SSL used to perform sensing during a vertical blank period Vertical Blank of a subsequent frame. Such a sensing control line SSL may be preset through a lookup table. Accordingly, pixels PXL, which are arranged in parallel in a row direction (or a first direction DR1) of the display panel 100 and are disposed on one horizontal line coupled to one sensing control line SSL, may be selected to perform sensing. However, embodiments of the present disclosure are not limited thereto. For example, the sensing control line determiner 411*b* may select a plurality of sensing control lines SSL to perform sensing.

The sensing control line determiner 411*b* may be operated during the sensing period Sensing of the vertical blank period Vertical Blank depending on whether the data enable signal DE has been applied. For example, when the data enable signal DE is not applied for a predetermined period of time, the sensing control line determiner 411*b* may determine the sensing control line SSL required to perform sensing. For example, the date enable signal DE may be considered as being applied when toggling and considered as not being applied when maintain at a constant level.

The sensing control line determiner 411*b* may provide information about the numbers and/or the locations of the sensing control lines SSL and sensing pixels PXL of the current frame and the subsequent frame, determined to perform sensing, to the image data storage 412*b* and the load calculator 413*b*.

The image data storage 412*b* may store all of the image data DAT supplied to the pixels PXL during the active period Active. Also, the image data storage 412*a* may store image data DAT supplied to the pixels PXL coupled to the sensing control lines SSL, determined to perform sensing, during the active period Active before the sensing period Sensing. The information about the numbers and/and locations of the sensing control lines SSL and the pixels PXL, determined to perform sensing, may be provided from the sensing control line determiner 411*b*. For example, the image data storage 412*b* may receive the information about the numbers and/or locations of sensing control lines SSL and the pixels PXL, determined to perform sensing in the current frame, and may then store the image data DAT supplied to the sensing pixels PXL.

The image data storage 412*b* may be operated during the sensing period Sensing of the vertical blank period Vertical Blank depending on whether the data enable signal DE has been applied. For example, when the data enable signal DE is applied for a predetermined period of time, the image data storage 412*b* may store the image data DAT transferred to the sensing pixels PXL, among the pixels PXL, during the active period Active of the current frame.

The image data storage 412*b* may provide the image data DAT of the pixels PXL, determined to perform sensing in the current frame, to the corrector 415*b*.

The load calculator 413*b* may calculate an accumulated load for the pixels PXL coupled to the sensing control lines SSL disposed in a portion of the display panel 100, which is higher than that of the sensing control lines SSL, determined to perform sensing in the current frame, in a column direction (or a second direction DR2).

The load calculator 413*b* may be provided with the information about the numbers and/and locations of the sensing control lines SSL and the pixels PXL, determined to perform sensing, may be provided from the sensing control line determiner 411*b*. The load calculator 413*b* may be provided with the image data DAT applied to the pixels PXL during the active period Active of the current frame, and may calculate the accumulated load up to the pixels PXL disposed on a previous horizontal line of the sensing pixels PXL in the column direction in consideration of the provided image data DAT.

The load calculator 413*b* may provide the accumulated load value to the initialization voltage predictor 422*b*.

The initialization voltage predictor 422*b* may be provided with information about the load value accumulated in the current frame from the load calculator 413*b*, and may be provided with the information about the sensing control lines SSL and the sensing pixels PXL to be sensed in the subsequent frame from the sensing control line determiner 411*b*. In an embodiment, the initialization voltage to be provided in each frame may be influenced by the accumulated load.

The initialization voltage predictor 422*b* may predict an initialization voltage data to be provided to the sensing pixels PXL in a subsequent frame in consideration of the numbers and/or locations of sensing control lines SSL and sensing pixels PXL to be sensed in the subsequent frame, based on the load value accumulated in the current frame. For example, the initialization voltage predictor 422*b* may predict first initialization voltage data to be applied to the sensing pixels PXL during the active period Active of the subsequent frame and second initialization voltage data to be applied to the sensing pixels PXL after the sensing period in the vertical blank period Vertical Blank.

The initialization voltage predictor 422*b* may provide the correction grayscale calculator 414*b* with the first initialization voltage data and the second initialization voltage data to be provided to the sensing pixels PXL in the subsequent frame.

Based on the difference between the first initialization voltage data to be transferred to the sensing pixels PXL during the active period Active of the subsequent frame and the second initialization voltage data to be transferred to the sensing pixels PXL after the sensing period of the subsequent frame, the correction grayscale calculator 414*b* may calculate a correction grayscale value corresponding to the difference between the pieces of voltage data. The correction grayscale calculator 414*b* may provide the calculated correction grayscale value to the corrector 415*b*.

The corrector 415*b* may receive the image data DAT of the sensing pixels PXL from the image data storage 412*b* during the active period Active and receive the correction grayscale value for the sensing pixels PXL from the correction grayscale calculator 414*b*, and may then generate rewrite image data REDAT by applying the correction grayscale value to the image data DAT. In an embodiment, the corrector 415*b* generates the rewrite image data REDAT by adding the correction grayscale value to the image data DAT of the sensing pixels PXL, but embodiments of the present disclosure are not limited thereto.

The corrector 415*b* may provide the rewrite image data REDAT to the data driver 310, and the data driver 310 may convert the rewrite image data REDAT into a rewrite data voltage REDATA, and may supply the rewrite data voltage REDATA during a data rewrite period Re-write after the sensing period under the control of the timing controller 410.

In an embodiment, the initialization voltage VINIT that is to be transferred to the pixel PXL (e.g., the second node N2) during the active period Active of the subsequent frame and the initialization voltage VINIT that is to be transferred to the pixel PXL (e.g., the second node N2) after the sensing period Sensing are predicted. Accordingly, even if the source voltage of the driving transistor T1 (or the voltage of the second node N2) included in the pixel PXL has varied before and after sensing, the rewrite data voltage REDATA corresponding to the source voltage of the driving transistor T1 is applied to the gate voltage of the driving transistor T1 (or the voltage of the first node N1). Thus a display device in which a luminance difference does not occur in the light-emitting element LD may be implemented.

Therefore, in a display device according to an embodiment, a phenomenon in which a horizontal line is visually perceived and occurs due to real-time sensing during external compensation may be suppressed.

Hereinafter, a method of correcting a data voltage depending on the location of a horizontal line will be described in detail with reference to FIGS. 8 to 10.

Figure 8:
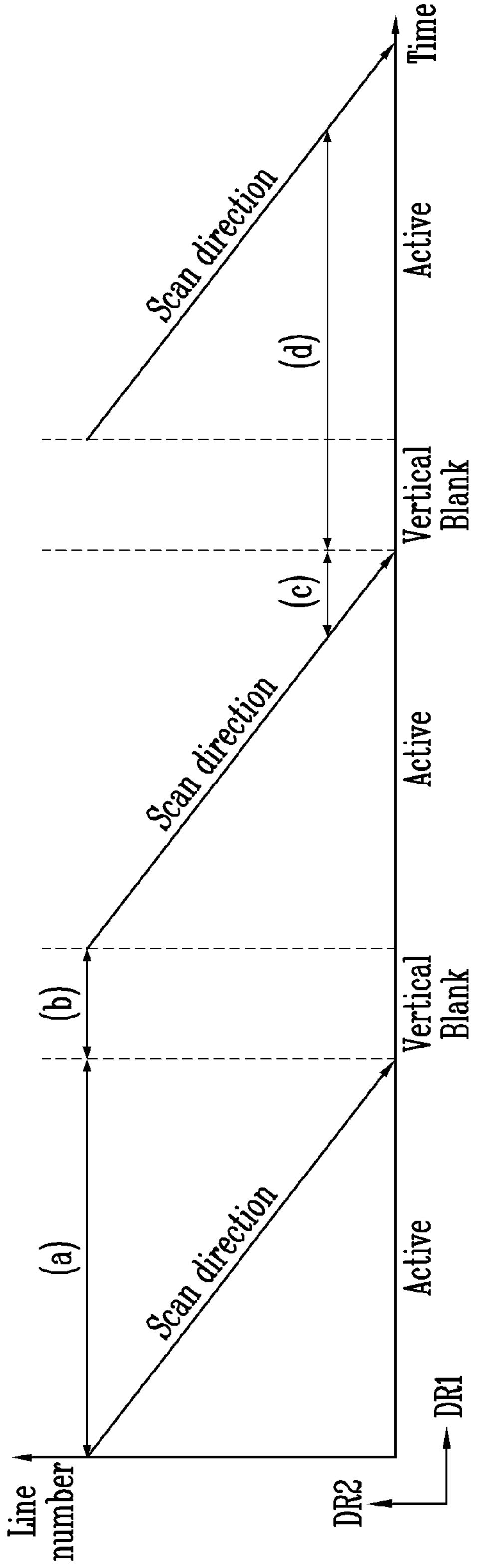
FIG. 8 is a diagram illustrating an example of the operation of the display device of FIG. 1.
Figure 9:
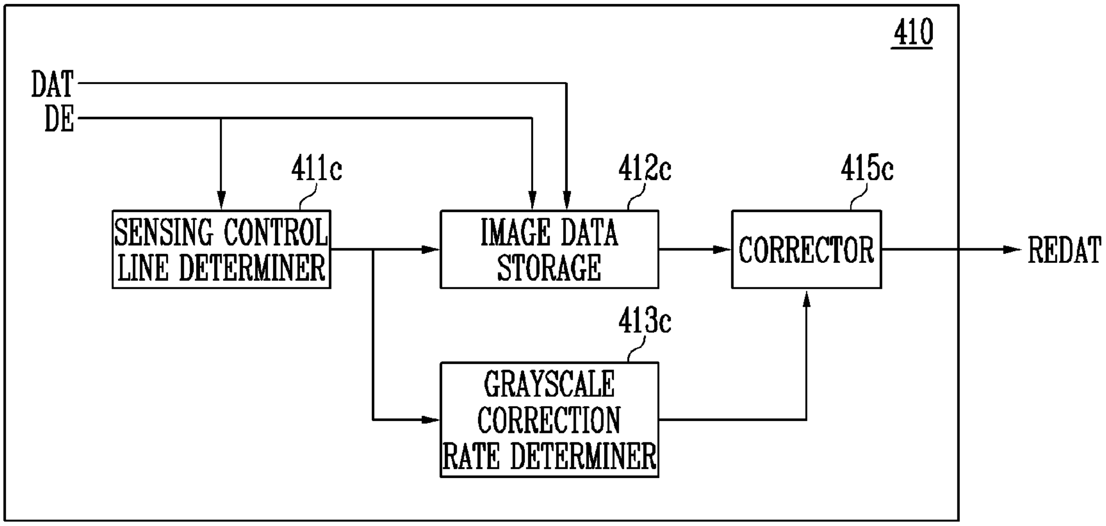
FIG. 9 is a block diagram illustrating an example of the timing controller included in the display device of FIG. 1.
Figure 10:
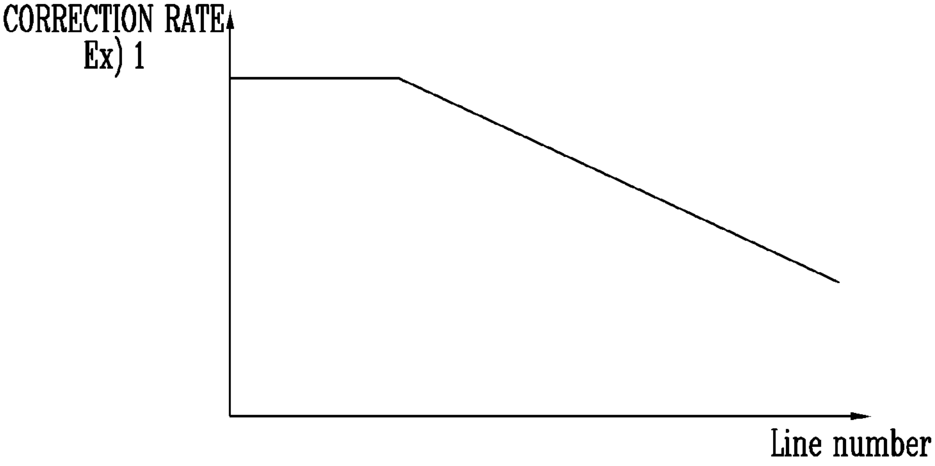
FIG. 10 is a diagram illustrating the operation of a grayscale correction rate determiner of FIG. 9.

FIG. 8 is a diagram illustrating an example of the operation of the display device of FIG. 1, FIG. 9 is a block diagram illustrating an example of the timing controller included in the display device of FIG. 1, and FIG. 10 is a diagram illustrating the operation of the grayscale correction rate determiner of FIG. 9. Hereinafter, a description will be made with reference to FIGS. 8 to 10 along with the descriptions of FIGS. 1 to 5.

First, referring to FIG. 8, the pixels PXL of the display device may be driven during an active period Active and a vertical blank period Vertical Blank.

During the active period Active, a scan signal (e.g., S[n] of FIG. 3) is sequentially applied to a plurality of scan lines (e.g., SL of FIG. 1), arranged in parallel in a first direction DR1 (or a row direction), in a second direction DR2 (or a column direction) from above to below. The direction in which the scan signal S[n] is applied (i.e., scan direction) may be a diagonal direction illustrated in FIG. 8.

Accordingly, the scan signal S[n] may be applied first to the scan line SL arranged in an upper portion in the second direction DR2, and the first transistor T1 may generate a driving current depending on the difference between the data voltage DATA transferred to the first node N1 of the pixel PXL and an initialization voltage VINIT transferred to the second node N2 of the pixel PXL during the active period Active. Therefore, the light-emitting element LD may emit light with predetermined luminance due to the difference between the written data voltage DATA and the initialization voltage VINIT during the active period Active (or (a)).

During the active period Active (or (c)), as the scan signal S[n] is sequentially applied in the second direction DR2 from above to below, the time during which pixels PXL, disposed in a lower portion of the display panel 100, emit light may be decreased from the time during which the pixels PXL, disposed in an upper portion of the display panel 100, emit light due to the voltage difference between the written data voltage DATA and the initialization voltage VINIT during the active period Active.

Thereafter, during the data rewrite period Re-write of the vertical blank period Vertical Blank (or (b)), the data voltage DATA is provided again to the first node N1 of the sensed pixel PXL and the initialization voltage VINIT is provided again to the second node N2. Thus the first transistor T1 may generate a driving current, and the light-emitting element LD may emit light with a predetermined luminance.

However, the difference between the provided data voltage DATA and the initialization voltage VINIT that are provided during the data rewrite period Re-write and a subsequent active period Active (or (d)) may be increased, so that the light-emitting element LD emits light brighter than that in the active period Active, and thus the pixels PXL disposed in a lower portion of the display panel 100 may be visually perceived more brightly than the pixels PXL disposed in an upper portion of the display panel 100.

Therefore, the display device according to an embodiment corrects the grayscale values of the pixels PXL depending on the location of the horizontal line of the display panel 100 so as to minimize the luminance difference between the pixels PXL disposed in the lower portion of the display panel 100 and the pixels PXL disposed in the upper portion of the display panel 100.

Referring to FIG. 9, the timing controller 410 may include a sensing control line determiner 411*c*, an image data storage 412*c*, a grayscale correction rate determiner 413*c*, and a corrector 415*c*.

The sensing control line determiner 411*c* may determine at least one sensing control line (e.g., SSL of FIG. 1) used to perform sensing during a vertical blank period Vertical Blank. In an embodiment, the determined sensing control line SSL may be any one sensing control line SSL, among the plurality of sensing control lines SSL illustrated in FIG. 1. Such a sensing control line SSL may be preset through a lookup table. Accordingly, pixels PXL, which are arranged in parallel in a row direction (or a first direction DR1) of the display panel (e.g., 100 of FIG. 1) and are disposed on one horizontal line coupled to one sensing control line SSL, may be selected to perform sensing. However, embodiments of the present disclosure are not limited thereto. For example, the sensing control line determiner 411*c* may select a plurality of sensing control lines SSL to perform sensing.

The sensing control line determiner 411*c* may receive the data enable signal DE, and may be operated during the sensing period Sensing of the vertical blank period Vertical Blank depending on whether the data enable signal DE has been applied. For example, when the data enable signal DE is not applied for a predetermined period of time, the sensing control line determiner 411*c* may determine the sensing control line SSL used to perform sensing.

The sensing control line determiner 411*c* may provide information about the numbers and/or the locations of sensing control lines SSL and sensing pixels PXL, determined to perform sensing, to the image data storage 412*c* and the grayscale correction rate determiner 413*c*.

The image data storage 412*c* may store image data DAT supplied to the pixels PXL coupled to the sensing control lines SSL determined to perform sensing during an active period Active before the sensing period Sensing. The information about the number and/or locations of the sensing control lines SSL determined to perform sensing may be provided from the sensing control line determiner 411*c*.

The image data storage 412*c* may be operated during the sensing period Sensing of the vertical blank period Vertical Blank depending on whether the data enable signal DE has been applied. For example, when the data enable signal DE is applied for a predetermined period of time, the image data storage 412*c* may store the image data DAT transferred to the pixels PXL determined to perform sensing, among the pixels PXL, during the active period Active before the sensing period Sensing.

The image data storage 412*c* may provide the image data DAT of the pixels PXL determined to perform sensing to the corrector 415*c*.

The grayscale correction rate determiner 413*c* may determine a grayscale correction rate depending on the numbers and/or the locations of sensing control lines SSL and/or sensing pixels PXL of the display panel 100. The grayscale correction rates depending on the numbers and/or locations of the sensing control lines SSL and/or the sensing pixels PXL may be stored in advance in a lookup table. The lookup table may store data about grayscale correction rates depending on the numbers and/or locations of sensing control lines SSL and/or the sensing pixels PXL in consideration of a grayscale variation attributable to a driving frequency or the like.

For example, low grayscale values may be reflected in the pixels PXL disposed in the lower portion of the display panel 100 so that the luminance of the pixels PXL coupled to the sensing control lines SSL disposed in the lower portion of the display panel 100 is lower than the luminance of the pixels PXL coupled to sensing control lines SSL disposed in the upper portion of the display panel 100.

Referring to FIG. 10, the grayscale correction rate determiner 413*c* may check a graph of correction rates used to correct the grayscale depending on the location of the sensing control lines SSL.

The grayscale correction rate determiner 413*c* may set the correction rate so that, as the line number of a sensing control line SSL increases, that is, as the sensing control line SSL is disposed in the lower portion of the display panel 100, the corresponding pixel has a lower grayscale value. Accordingly, in the display device according to an embodiment, the display panel may display images with entirely uniform luminance regardless of the location of the sensing control line SSL.

The grayscale correction rate determiner 413*c* may provide the determined grayscale correction rate to the corrector 415*c*.

The corrector 415*c* may receive the image data DAT of the sensing pixel PXL from the image data storage 412*c* during the active period Active and receive the grayscale correction rate from the correction grayscale rate determiner 413*c*, and may then generate rewrite image data REDAT by applying the grayscale correction rate to the image data DAT. In an embodiment, the corrector 415*c* generates the rewrite image data REDAT by multiplying the grayscale correction rate by the image data DAT of the sensing pixel PXL, but embodiments of the present disclosure are not limited thereto.

The corrector 415*c* may provide the rewrite image data REDAT to the data driver 310, and the data driver 310 may convert the rewrite image data REDAT into a rewrite data voltage REDATA, and may supply the rewrite data voltage REDATA during a data rewrite period Re-write after the sensing period under the control of the timing controller 410.

Accordingly, in a display device according to an embodiment, the display panel may display images with entirely uniform luminance regardless of the location of the sensing control line SSL. That is, a phenomenon in which a horizontal line is visually perceived due to real-time sensing during external compensation may be suppressed.

In one of the above-described embodiments, the timing controller 410 may be configured such that respective components described above with reference to FIG. 5 and respective components described above with reference to FIG. 9 are implemented together. Further, in an embodiment, the timing controller 410 may be configured such that respective components described above with reference to FIG. 6 and respective components described above with reference to FIG. 9 are implemented together.

While various exemplary embodiments have been described above, those of ordinary skill in the art will appreciate that various modifications, additions and substitutions are possible, without departing from the scope and spirit of the disclosure.

In accordance with an embodiment of the disclosure, an initialization voltage that is transferred to a pixel (e.g., a source electrode of a driving transistor) during an active period and an initialization voltage that is transferred to the pixel (e.g., the source electrode of the driving transistor) after a sensing period of a vertical blank period may be measured or predicted. Even if a source voltage of the driving transistor varies before and after sensing, a data voltage corresponding to the source voltage of the driving transistor is rewritten to a gate voltage of the driving transistor during a data rewrite period. Thus a display device, in which a luminance difference does not occur in a light-emitting element, may be implemented.

Further, in a display device according to an embodiment, a display panel may display images with entirely uniform luminance regardless of the location of a sensing control line.

Therefore, a phenomenon in which a horizontal line is visually perceived due to real-time sensing using an external compensation circuit may be suppressed.

What is claimed is:

1. A display device, comprising:

a plurality of pixels coupled to a sensing control line extending in a first direction;

a data line extending in a second direction vertical to the first direction;

a timing controller configured to determine a grayscale correction rate based on information of the sensing control line, and generate rewrite image data from input image data of a sensing pixel among the pixels coupled to the sensing control line and the grayscale correction rate; and a driver circuit configured to supply a rewrite data voltage to the sensing pixel based on the rewrite image data, wherein a data voltage supplied to the pixels during an active period of a frame period is different from the rewrite data voltage supplied to the sensing pixel during a vertical blank period of the frame period, and wherein the rewrite image data is determined from a difference between an initialization voltage supplied during the active period and an initialization voltage supplied during the vertical blank period.

2. The display device according to claim 1, wherein the driver circuit supplies the rewrite data voltage to the sensing pixel through the data line during a data rewrite period in which a previous image display state is reconstructed due to supply of the rewrite data voltage after a sensing period in which characteristics of the sensing pixel are sensed.

3. The display device according to claim 2, wherein the timing controller sets the grayscale correction rate so that as a row number of the sensing control line increases in the second direction, a grayscale value of the grayscale correction rate decreases.

4. The display device according to claim 1, wherein the information of the sensing control line comprises number and location information of the sensing control line and number and location information of the sensing pixel.

5. The display device according to claim 1, wherein the grayscale correction rate is determined based on number and location information of the sensing control line, number and location information of the sensing pixel, and a grayscale variation according to a driving frequency.

6. A display device, comprising:

a plurality of pixels coupled to a sensing control line extending in a first direction;

a data line extending in a second direction vertical to the first direction;

a timing controller configured to determine a grayscale correction rate based on information of the sensing control line and a grayscale variation according to a driving frequency, and generate rewrite image data from input image data of a sensing pixel among the pixels coupled to the sensing control line and the grayscale correction rate; and a driver circuit configured to supply a rewrite data voltage to the sensing pixel based on the rewrite image data, wherein a data voltage supplied to the pixels during an active period of a frame period is different from the rewrite data voltage supplied to the sensing pixel during a vertical blank period of the frame period, and wherein the information of the sensing control line comprises number and location information of the sensing control line and number and location information of the sensing pixel.

7. The display device according to claim 6, wherein the driver circuit supplies the rewrite data voltage to the sensing pixel through the data line during a data rewrite period in which a previous image display state is reconstructed due to supply of the rewrite data voltage after a sensing period in which characteristics of the sensing pixel are sensed.

8. The display device according to claim 7, wherein the timing controller sets the grayscale correction rate so that as a row number of the sensing control line increases in the second direction, a grayscale value of the grayscale correction rate decreases.

9. The display device according to claim 6, wherein the rewrite image data is determined from a difference between an initialization voltage supplied during the active period and an initialization voltage supplied during the vertical blank period.

10. The display device according to claim 6, wherein: the active period is a period during which an image is displayed, and the vertical blank period includes a sensing period during which characteristics of the sensing pixel are sensed and a data rewrite period during which a previous image display state is reconstructed due to supply of the rewrite image data after the sensing period.

* * * * *